United States Patent

Brakel

[11] 4,061,159
[45] Dec. 6, 1977

[54] HYDRAULIC VALVE

[75] Inventor: Kornelius Brakel, Schwieberdingen, Germany

[73] Assignee: Robert Bosch G.m.b.H., Stuttgart, Germany

[21] Appl. No.: 730,714

[22] Filed: Oct. 8, 1976

[30] Foreign Application Priority Data

Dec. 17, 1975 Germany .............................. 2556708

[51] Int. Cl.² .............................................. F17D 3/00
[52] U.S. Cl. .................. 137/596; 137/596.13; 91/446
[58] Field of Search .............. 137/596, 596.12, 596.13; 91/446

[56] References Cited

U.S. PATENT DOCUMENTS

| | | | |
|---|---|---|---|
| 3,455,210 | 7/1969 | Allen | 91/446 |
| 3,970,108 | 7/1976 | Ailshie | 137/596 X |
| 3,986,522 | 10/1976 | Janvrin | 137/596 X |

Primary Examiner—Edgar W. Geoghegan
Attorney, Agent, or Firm—Michael J. Striker

[57] ABSTRACT

A hydraulic valve includes a valve body which is provided with a fluid inlet chamber, a pair of user chambers arranged for communication with users of the fluid admitted into the valve body and a pair of return chambers for recovering fluid from the users and recycling the fluid to a source of the same. The valve body further includes a longitudinal passage which connects the various chambers. A spool is slidably mounted in the longitudinal passage and, depending upon the position thereof, permits a user chamber to communicate with the fluid inlet chamber while the corresponding return chamber is sealed from the user chamber or permits the user chamber to communicate with the corresponding return chamber while the user chamber is sealed from the fluid inlet chamber. A flow channel extends across the width of the valve body and opens to either side of the latter. The flow channel is arranged for communication with the source of the fluid and with the fluid inlet chamber. The flow channel is positioned between the spool and the connections provided in the valve body for connecting the user chambers to the users and is symmetrically arranged with respect to the user chambers. A valve element is provided for selectively sealing the flow channel from the fluid inlet chamber and for selectively providing communication between the flow channel and the fluid inlet chamber. The valve element includes a slidable sealing member which has a closed position in which the flow channel is sealed from the fluid inlet chamber and an open position in which the flow channel is in communication with the fluid inlet chamber. The sealing member is arranged in the flow channel and is provided with a bore which forms part of the flow channel. The sealing member has a face which is exposed to the flow channel so as to be subjected to the pressure acting in the latter. A biasing member biases the sealing member towards its closed position.

10 Claims, 3 Drawing Figures

HYDRAULIC VALVE

BACKGROUND OF THE INVENTION

The invention relates generally to hydraulic valves.

Of particular interest to the invention is a hydraulic valve of the type having a spool mounted for longitudinal movement in a housing or valve body. The valve body is provided with a fluid inlet chamber, at least one user chamber which is arranged for communication with a user of the fluid and (at least one return or reflux chamber for recovering fluid from the user. Depending upon its position, the spool permits the user chamber to communicate with the fluid inlet chamber while sealing the user chamber from the return chamber or permits the user chamber to communicate with the return chamber while sealing the user chamber from the fluid inlet chamber. The valve body is further provided with a flow channel which is arranged for communication with a source of fluid and opens to a pair of sides or flange faces of the valve body. The flow channel is arranged so that it may communicate with the fluid inlet chamber and a check valve is provided for sealing the fluid inlet chamber from the flow channel. The check valve includes a sealing member which is biased towards a closed position, that is, a position in which the fluid inlet chamber is sealed from the flow channel, by a spring.

In a known hydraulic valve of this type having a pair of user chambers, the check valve is arranged so that its axis extends parallel to the flow channel connecting the sides of the valve body. The sealing member of the check valve, together with a spring, is inserted into a blind bore from a flange face or side of the valve body. This construction requires a relatively large amount of space for the check valve, which latter also serves to seal the two user chambers from the flow channel. Such a large amount of space is hardly available in hydraulic valves, particularly in hydraulic valves having a block-like configuration. For a valve body of given size, the space required for a check valve which is constructed as described above results in decreased flow cross-sections and, consequently, in an increased resistance to flow. Moreover, the many changes in flow direction which are a result of the check valve construction described above lead to a further increase in the resistance to flow. In addition, by virtue of the above-outlined arrangement of the check valve, the known hydraulic valve of the type under consideration is expensive to manufacture and is not well-suited for the incorporation of additional valve elements in the same valve body.

SUMMARY OF THE INVENTION

An object of the invention is to provide a hydraulic valve of the type outlined above which overcomes the disadvantages mentioned, is simple and compact in its construction and presents a relatively low resistance to flow.

This object, as well as others which will become apparent hereinafter, are achieved in accordance with the invention. According to one aspect of the invention, a hydraulic valve comprises a valve body or housing having a fluid inlet chamber, a user chamber arranged for communication with a user of the fluid admitted into the valve body, a fluid return or reflux chamber for recovering fluid from the user, a flow channel arranged for communication with a source of the fluid and with the fluid inlet chamber, and a passage connecting the various chambers. A spool is movably mounted in the passage and has first and second positions. In the first position of the spool, the user chamber is in communication with the fluid inlet chamber and is sealed from the return chamber. In the second position of the spool, the user chamber is in communication with the return chamber and is sealed from the fluid inlet chamber. A valve element is provided for selectively sealing the fluid inlet chamber from the flow channel and for selectively providing communication between the fluid inlet chamber and the flow channel. The valve element includes a movable sealing member which is arranged in the flow channel and has at least two positions. In one position of the sealing member, the fluid inlet chamber is sealed from the flow channel whereas, in another position of the sealing member, the fluid inlet chamber communicates with the flow channel. The sealing member is provided with a conduit having a pair of ends which open to the flow channel and the sealing member has a face which is exposed to the flow channel so as to be subjected to the pressure acting in the flow channel. The valve element further includes a biasing member biasing the sealing member towards the position in which the fluid inlet chamber is sealed from the flow channel.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
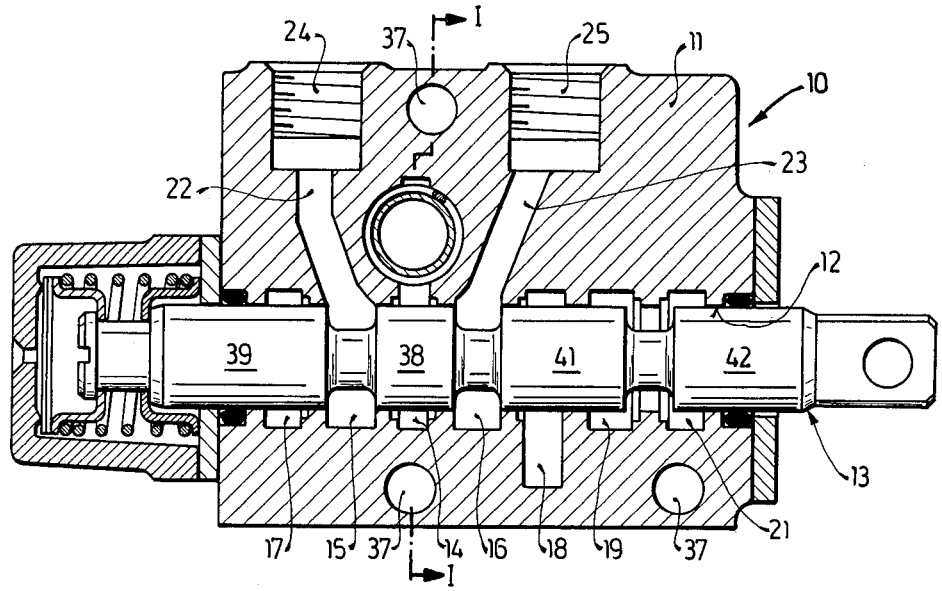
FIG. 1 represents a longitudinal section through one form of a hydraulic valve according to the invention.

The preferred embodiment of the invention relates to a hydraulic valve of the type having a spool mounted for longitudinal movement in a housing or valve body. The valve body is provided with a fluid inlet chamber, at least one user chamber which is arranged for communication with a user of the fluid admitted into the valve body and at least one return or reflux chamber for recovering fluid from the user of the fluid. Depending upon the position of the spool, the user chamber either communicates with the fluid inlet chamber while being sealed from the return chamber or communicates with the return chamber while being sealed from the fluid inlet chamber. The valve body is further provided with a flow channel which is arranged for communication with a source of hydraulic fluid and opens to a pair of sides or flange faces of the valve body. The flow channel is arranged so that it may communicate with the fluid inlet chamber and a valve element or check valve is provided for sealing the fluid inlet chamber from the flow channel. The check valve includes a sealing member which is biased towards a closed position, that is, a position in which the fluid inlet chamber is sealed from the flow channel, by a biasing member which is favorably in the form of a spring.

In a hydraulic valve of this type, the objects of the invention are achieved in that the sealing member of the check valve is positioned directly in the flow channel and is provided with a bore or conduit which forms part of the flow channel. Moreover the sealing member has a face which is exposed to the flow channel and, hence, the pressure acting therein, and this face is arranged so that a net or differential pressure set up in the flow channel may act upon it.

By using the construction just set forth for the check valve, the check valve may be positioned in the flow channel, which is present even in the absence of the check valve, so that practically no additional space is required for the construction of the check valve. Accordingly, the flow cross-sections may be relatively large. Moreover, the stream of hydraulic fluid undergoes fewer changes in direction which serves to further improve the resistance to flow presented by the hydraulic valve. In addition, the check valve is of relatively simple and economical construction.

A particularly compact arrangement is achieved when the fluid inlet chamber is provided with an extension which lies in the same cross-sectional plane as the fluid inlet chamber and extends across the flow channel.

According to one embodiment of the invention, the flow channel includes two portions of different inner diameter. The sealing member of the check valve is of tubular configuration and includes a sleeve-like section and a piston-like section which guide the sealing member in the flow channel. The sleeve-like section is at least in part accommodated in the portion of the flow channel which is of smaller diameter whereas the piston-like section is accommodated in the portion of the flow channel which is of larger diameter.

In accordance with a further embodiment of the invention, the extension of the fluid inlet chamber extends across the portion of the flow channel which is of larger diameter. An abutment for limiting the movement of the sealing member of the check valve is fixedly mounted in this larger-diameter portion of the flow channel. The flow channel has a step at the transition between the smaller-diameter and larger-diameter portions thereof and the biasing member or spring which biases the sealing member towards its closed position bears against the step, on the one hand, and against the piston-like section of the sealing member, on the other hand.

According to an additional embodiment of the invention, the extension of the fluid inlet chamber, as seen in cross-section, lies in the same half of the valve body as the abutment for limiting the movement of the sealing member.

Still another embodiment of the invention contemplates for the valve body to be provided with a pair of user chambers as well as a pair of connecting portions for connecting the user chambers to users of the hydraulic fluid. Here, it is particularly advantageous for the flow channel to be arranged intermediate the spool and the connecting portions and to be arranged symmetrically with respect to the user chambers.

Figure 2:
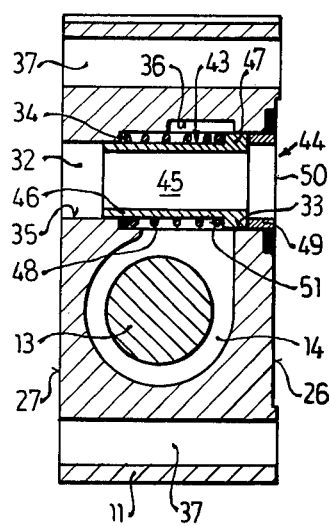
FIG. 2 is a view in the direction of the arrows I—I of FIG. 1.
Figure 3:
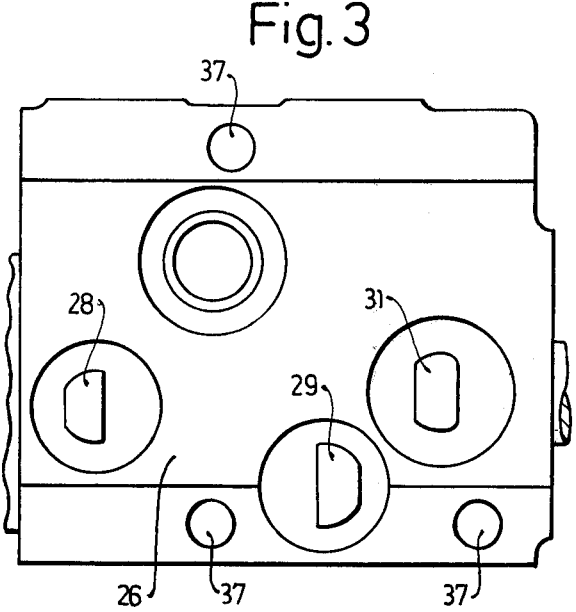
FIG. 3 is a partial side view of the hydraulic valve of FIG. 1.

Referring now to FIGS. 1 – 3 of the drawing, it is pointed out that the reference numeral 10 generally identifies a hydraulic valve which includes a block-like housing or valve body 11. The valve body 11 is provided with a longitudinally extending passage 12 and a longitudinally displaceable spool 13 is arranged in the passage 12.

In conventional manner, the valve body 11 is further provided with a fluid inlet chamber 14, two user chambers 15 and 16 which are arranged for communication with users of the hydraulic fluid, two return or reflux chambers 17 and 18 for recovering hydraulic fluid from the users thereof and two by-pass chambers 19 and 21. Conduits 22 and 23, respectively, lead from the user chambers 15 and 16 to respective connecting portions 24 and 25 provided in the valve body 11 for the purpose of connecting the latter with users of the hydraulic fluid flowing through the valve body 11.

The valve body 11 has a pair of side faces or flange faces 26 and 27 as best seen from FIG. 2. In each of the side faces 26 and 27, there is provided a pair of openings 28 and 29 which are connected with the return chambers 17 and 18, respectively. An opening 31 in the side face 26 communicates with the by-pass chamber 19 whereas a similar, non-illustrated opening in the side face 27 communicates with the by-pass chamber 21.

A flow channel 32 is provided in the valve body 11 and extends between the side faces 26 and 27 in a direction normal thereto. The flow channel 32 includes a larger channel portion 33, that is, a channel portion of larger diameter, which extends inwardly from the side face 26 and penetrates the valve body 11 to a location about two-thirds of the way through the width or thickness of the valve body 11. A step 34 is provided in the flow channel 32 and, at the step 34, the diameter of the flow channel 32 decreases, that is, a transition occurs from the channel portion 33 of larger diameter to a channel portion 35 of smaller diameter. The channel portion 35 of smaller diameter opens to the side face 27 of the valve body 11.

The channel portion 33 of larger diameter passes through an extension 36 of the fluid inlet chamber 14. The latter is arranged in a plane with the extension 36 thereof. The channel portion 33 of larger diameter is positioned as closely as possible to the passage 12 provided for the spool 13 and penetrates the valve body 11 in the region between the conduits 22 and 23 which, respectively, lead from the user chambers 15 and 16 to the respective connecting portions 24 and 25 provided for connecting the valve body 11 with users of the hydraulic fluid.

Three bores 37 for connecting rods are provided in the valve body 11 in order to permit a tensioning or tightening to be effected when two or more of the hydraulic valves 10 are connected with one another via flanged connections.

In conventional manner, the spool 13 is provided with four piston-like portions 38, 39, 41 and 42 in order to regulate the communication between the fluid inlet chamber 14 and one of the user chambers 15 or 16, on the one hand, and between the other user chamber 16 or 15 and the respective return chamber 18 or 17, on the other hand. In other words, by appropriately adjusting the position of the spool 13, one of the user chambers 15 or 16 may be placed in communication with the fluid inlet chamber 14 while, at the same time, the other of the user chambers 16 or 15 is placed in communication with the respective return chamber 18 or 17. By suitably readjusting the position of the spool 13, the user chamber 15 or 16 which was in communication with the fluid inlet chamber 14 may be placed in communication with the respective return chamber 17 or 18 while, at the same time, the user chamber 16 or 15 which was in communication with the return chamber 18 or 17 is placed in communication with the fluid inlet chamber 14.

As best seen in FIG. 2, the hydraulic valve 10 is provided with a valve element or check valve 44. The check valve 44 includes a tubular sealing member 43 which is arranged in the flow channel 32 and serves to seal off the fluid inlet chamber 14. The sealing member 43, which is provided with a central bore 45, comprises a sleeve-like section 46. The sleeve-like section 46 is sealingly and slidingly received in the channel portion 35 of smaller diameter and guides the sealing member 43 in this channel portion 35. The sealing member 43 further comprises a piston-like section 47 which is sealingly and slidingly received in the channel portion 33 of larger diameter and guides the sealing member in this channel portion 33.

By virtue of the different diameters, the sealing member 43 possesses a differential face 50 which is exposed to the flow channel 32 and, hence, the pressure acting therein, and upon which a net or differential pressure set up in the flow channel 32 may act. The sealing member 43 further possesses a pressure face 51 which is exposed to the fluid inlet chamber 14 and upon which the pressure generated in the fluid inlet chamber 14 may act.

A spring 48 is arranged between the sleeve-like section 46 of the sealing member 43 and the wall bounding the channel portion 33 of larger diameter. The spring 48 bears against the piston-like section 47 of the sealing member 43, on the one hand, and against the step 34 separating the channel portions 33 and 35, on the other hand.

A ring 49 is press-fitted into the channel portion 33 of larger diameter and forms an abutment for the sealing member 43. The ring 49 determines the terminal position of the sealing member 43 and, consequently, the degree to which the piston-like section 47 of the sealing member 43 is positively covered.

The operation of the hydraulic valve 10 will now be explained. For the purposes of explanation, it will be assumed that two of the hydraulic valves 10 are, in a manner known per se, arranged between a connecting plate and an end plate, and are connected with one another via a flanged connection to form an arrangement of block-like configuration.

When the hydraulic valves 10 are not actuated, the hydraulic fluid conveyed into the connecting plate via a pump flows through the by-pass chambers 19 and 21 into the end plate and back to the tank or source of the hydraulic fluid. Upon displacement of a spool 13, this hydraulic fluid cycle is interrupted by the piston-like portions 41 and 42 of the spool 13 and the hydraulic fluid flows into a flow channel 32 via the connecting plate. The flow channels 32 are sealed from the end plate. In the flow channel 32, the existing pressure acts upon the differential face 50 of the sealing member 43 and, accordingly, against the force exerted by the spring 48. When the pressure has increased sufficiently, the check valve 44 is opened. The hydraulic fluid can then flow directly from the flow channel 32 into the extension 36 of the fluid inlet chamber 14 along the shortest possible path and without undergoing numerous changes in direction. Thereafter, the fluid can, in conventional manner, travel to one of the connecting portions 24 and 25 provided in the valve body 11 for the purpose of connecting the latter with users of the hydraulic fluid.

If a pressure pulse is generated on the user side of the check valve 44 during a loading operation, e.g. during the lifting of a weight, and is sufficiently large to cause a higher pressure to exist in the fluid inlet chamber 14 than in the flow channel 32, then the check valve 44 will close as a result of the action of this higher pressure on the pressure face 51 of the sealing member 43.

When the pressure in the flow channel 32 and in the fluid inlet chamber 14 are equal, the check valve 44 will close due to the force exerted by the spring 48 thereof.

The hydraulic fluid may flow into the check valve 44 from either of the side faces 26 and 27 of the valve body 11 so that the positioning of the hydraulic valve 10 within a block may be selected at will independently of the check valve 44. It is particularly advantageous, however, for the hydraulic fluid to flow into the flow channel 32 via the side face 26 of the valve body 11.

When a hydraulic valve similar to the hydraulic valve 10 and arranged downstream thereof is activated, the stream of hydraulic fluid flows through the bore 45 of the sealing member 43 provided in the upstream hydraulic valve 10. Here, there exists the possibility that the sealing member 43 of the upstream hydraulic valve 10 will be dragged along by the stream of hydraulic fluid thereby opening the check valve 44. When the pressure in the fluid inlet chamber 14 is the same as, or is lower than, the pressure in the flow channel 32, the dragging along of the sealing member 43 by the hydraulic fluid stream is permissible. On the other hand, when the pressure in the fluid inlet chamber 14 is greater than that in the flow channel 32, the pressure in the fluid inlet chamber 14, with the help of the pressure face 51 of the sealing member 43, generates a force which hinders the dragging along of the sealing member 43 and maintains the check valve 44 in its closed position.

It will be understood that modifications in the illustrated construction are possible without departing from the inventive concepts.

Without further analysis, the foregoing will so fully reveal the gist of the present invention that others can, by applying current knowledge, readily adapt it for various applications without omitting features that, from the standpoint of prior art fairly constitute essential characteristics of the generic or specific aspects of this invention.

What is claimed as new and desired to be protected by Letters Patent is set forth in the appended claims.

1. A hydraulic valve, comprising a valve body having a fluid inlet chamber, a user chamber arranged for communication with a user of the fluid admitted into said valve body, a fluid return chamber for recovering fluid from the user, a flow channel arranged for communication with a source of fluid and with said fluid inlet chamber, and a passage connecting said chambers; a spool movably mounted in said passage, said spool having a first position in which said user chamber is in communication with said fluid inlet chamber and is sealed from said return chamber, and said spool having a spool position in which said user chamber is in communication with said return chamber and is sealed from said inlet chamber; and a valve element for selectively sealing said inlet chamber from said flow channel and for selectively providing communication between said inlet chamber and said flow channel, said valve element including a movable sealing member which is arranged in said flow channel, and said sealing member having one position in which said inlet chamber is sealed from said flow channel and another position in which said inlet chamber communicates with said flow channel, said sealing member being provided with a conduit having a pair of ends which open to said flow channel, and said sealing member having a face which is exposed to said flow channel so as to be subjected to the pressure acting in said flow channel, said valve element further including a biasing member biasing said sealing member towards said one position.

2. A hydraulic valve as defined in claim 1, wherein said passage extends in longitudinal direction of said valve body and said spool is mounted for movement in said longitudinal direction.

3. A hydraulic valve as defined in claim 1, wherein said sealing member is of tubular configuration and is arranged so that said conduit constitutes part of said flow channel.

4. A hydraulic valve as defined in claim 1, said valve body having a pair of opposite sides spaced by the width of said valve body; and wherein said flow channel extends between and opens to both of said sides.

5. A hydraulic valve as defined in claim 4, said sealing member being of tubular configuration and being arranged so that said conduit constitutes part of said flow channel, and said valve element acting as a check valve; and wherein said passage extends in longitudinal direction of said valve body and said spool is mounted for movement in said longitudinal direction, said biasing member comprising a spring.

6. A hydraulic valve as defined in claim 1, wherein said valve body comprises an additional channel which extends across said flow channel and constitutes an extension of said inlet chamber, said additional channel and said inlet chamber being arranged so as to have at least one common cross-sectional plane.

7. A hydraulic valve as defined in claim 1, said flow channel including first and second portions of different inner diameter; and wherein said sealing member is of tubular configuration and comprises first and second sections which guide said sealing member in said flow channel, said first section of said sealing member being arranged at least in part in said first portion of said flow channel and said second section of said sealing member being arranged in said second portion of said flow channel.

8. A hydraulic valve as defined in claim 7, said valve body comprising an additional channel which extends across the larger of said portions of said flow channel and constitutes an extension of said inlet chamber, and said additional channel and said inlet chamber being arranged so as to have at least one common cross-sectional plane; and wherein an abutment for limiting the movement of said sealing member is fixedly mounted in the larger of said portions of said flow channel and said flow channel is provided with a step at the transition between said first and second portions thereof, said biasing member bearing against said step and against the larger of said sections of said sealing member to thereby bias said sealing member towards said one position.

9. A hydraulic valve as defined in claim 8, wherein said additional channel, as seen in cross-section, is arranged in the same half of said valve body as said abutment.

10. A hydraulic valve as defined in claim 1, said valve body including an additional user chamber and being provided with connecting portions for connecting said user chambers with users of the fluid admitted into said valve body; and wherein said flow channel is arranged between said spool and said connecting portions and is also substantially symmetrically arranged with respect to said user chambers.

* * * * *